United States Patent
Bard et al.

(10) Patent No.: US 7,089,513 B2
(45) Date of Patent: Aug. 8, 2006

(54) INTEGRATED CIRCUIT DESIGN FOR SIGNAL INTEGRITY, AVOIDING WELL PROXIMITY EFFECTS

(75) Inventors: Karen A. Bard, Hopewell Junction, NY (US); Ronald D. Rose, Essex Junction, VT (US); Michael H. Sitko, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 10/708,715

(22) Filed: Mar. 19, 2004

(65) Prior Publication Data

US 2005/0210431 A1 Sep. 22, 2005

(51) Int. Cl.
*G06F 17/50* (2006.01)

(52) U.S. Cl. .................................. 716/4; 716/5; 716/1

(58) Field of Classification Search ............... 716/4, 716/5, 1
See application file for complete search history.

(56) References Cited

U.S. PATENT DOCUMENTS

| | | | |
|---|---|---|---|
| 5,875,117 A | 2/1999 | Jones et al. ............... 716/14 |
| 2003/0145296 A1 | 7/2003 | Chandra et al. ............ 716/5 |
| 2003/0182640 A1* | 9/2003 | Alani et al. ............... 716/4 |

OTHER PUBLICATIONS

Karlsson et al.,"Analytical Extraction Method for Submicron MOS Transistor Model Parameters in the Linear Region", Dec. 1994, IEEE Proceedings on Circuits, Devices and Systems, vol. 141, iss. 6, pp. 457-461.*
Assenmacher, "BSIM 4 Modeling and Parameter Extraction", Jan. 2003, Infineon Technologies AG, Presentation View Graphs, pp. 1-23.*
Xi et al.,"BSIM4.5.0 Enhancements", Jun. 2005, University of California-Berkeley, Presentation Vie Graphs, pp. 1-9.*
Polishchuk et al., "CMOS Vt-Control Improvement Through Implant Lateral Scatter Elimination", Sep. 2005, IEEE International Symposium on Semiconductor Manufacturing, Paper Digest, pp. 193-196.*
"BSIM4.5.0. Manual: Chapter 14: Well Proximity Effect Model", 2005, University of California-Berkeley, 14-1-14-7.*

* cited by examiner

*Primary Examiner*—Sun James Lin
(74) *Attorney, Agent, or Firm*—Richard M. Kotulak; Hoffman, Warnick & D'Alessandro LLC

(57) ABSTRACT

A method, system and program product for designing an integrated circuit (IC) for signal integrity. The invention conducts a signal integrity analysis on an IC design; identifies any field effect transistor (FET) that causes a signal integrity failure in the case that the IC design fails the signal integrity analysis; and modifies an edge of a failing FET that is closer than a threshold distance to a well edge. The invention eliminates the manual, iterative procedure for determining the device causing a signal integrity failure due to well proximity effects.

20 Claims, 3 Drawing Sheets

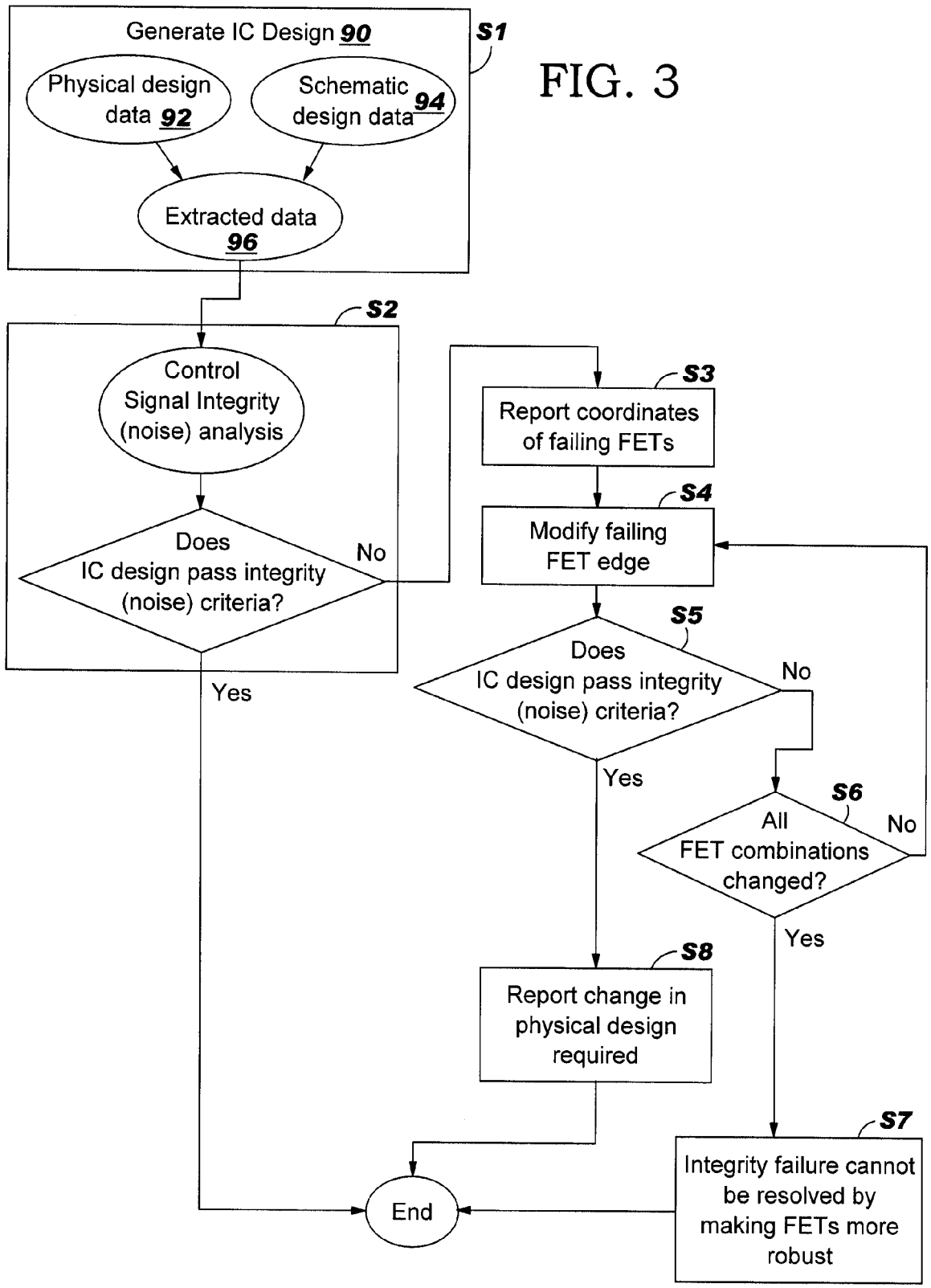

INTEGRATED CIRCUIT DESIGN FOR SIGNAL INTEGRITY, AVOIDING WELL PROXIMITY EFFECTS

BACKGROUND OF INVENTION

1. Technical Field

The present invention relates generally to integrated circuit design, and more particularly, relates to a system, method and program product for designing an IC for signal integrity due to well proximity effects.

2. Related Art

In very large scale integrated (VLSI) circuit design, the proximity of a transistor's source or drain diffusion to a well edge affects its threshold voltage. Transistors designed in the same technology, even on the same integrated circuit (IC), will have different threshold voltages (Vt) depending on their active area's proximity to an implanted well edge. For example, FIG. 1 illustrates conventional complementary metal oxide semiconductor (CMOS) p-type field effect transistors (FET) 10 including a first device 12, a second device 14 and a third device 16. Devices 12, 14, 16 are located over an n-type well 20 that is positioned within a p-type substrate 22. An area 24 is considered an active area. Each device 12, 14, 16 is formed by the intersection of the gate polysilicon and active area 24. A distance D1 between a device edge 30 of first device 12 and an edge 32 of n-well 20 is sufficiently large enough to ensure that the threshold voltage Vt of first device 12 is as predicted by a device model. However, distance D2 between a device edge 34 of third device 16 and an edge 36 of n-well 20 is close enough so that third device 16 will have a threshold voltage Vt shift relative to a predicted device model.

Devices with a lower threshold voltage (Vt) have a greater sensitivity to electrical noise compared to more robust transistors. Depending on the expected sources of electrical noise and the required robustness of the IC design, it may or may not be desirable to place all transistors far enough away from a well edge to eliminate the effect. For example, in dense designs where circuits are robust and insensitive to noise, the well edge can be as close as allowed by the technology's design rules. In contrast, in noise sensitive designs, circuits that functionally fail due to noise can be modified if the devices are moved away from the well edge.

The conventional approach to testing signal integrity or signal noise analysis is to use computer-based tools to address those issues only. When one of these tools indicates a signal integrity failure, a designer must review the output from the tool and manually change his/her design to attempt to correct the failure, e.g., guess at which device caused the failure and move an edge of that device away from a well edge. Subsequently, the designer must re-execute the signal integrity analysis to determine whether the change corrected the failure. If the change did not fix the failure, the process is repeated. Therefore, this approach is time consuming and resource intensive. In view of the foregoing, there is a need in the art for an IC design method, system and program product that does not suffer from the problems of the related art.

SUMMARY OF INVENTION

The invention includes a method, system and program product for designing an integrated circuit (IC) for signal integrity. The invention conducts a signal integrity analysis on an IC design; identifies any field effect transistor (FET) that causes a signal integrity failure in the case that the IC design fails the signal integrity analysis; and modifies an edge of a failing FET that is closer than a threshold distance to a well edge. The invention eliminates the manual, iterative procedure for determining the device causing a signal integrity failure due to well proximity effects. A first aspect of the invention is directed to a method of designing an integrated circuit (IC) for signal integrity, the method comprising the steps of: conducting a signal integrity analysis on an IC design; identifying any field effect transistor (FET) that causes a signal integrity failure in the case that the IC design fails the signal integrity analysis; and modifying an edge of a failing FET that is closer than a threshold distance to a well edge.

A second aspect of the invention is directed to a system for designing an integrated circuit (IC) for signal integrity, the method comprising the steps of: means for conducting a signal integrity analysis on an IC design; means for identifying any field effect transistor (FET) that causes a signal integrity failure in the case that the IC design fails the signal integrity analysis; and means for modifying an edge of any failing FET that is closer than a threshold distance to a well edge.

A third aspect of the invention is directed to a computer program product comprising a computer useable medium having computer readable program code embodied therein for designing an integrated circuit (IC) for signal integrity, the program product comprising: program code configured to conduct a signal integrity analysis on an IC design; program code configured to identify any field effect transistor (FET) that causes a signal integrity failure in the case that the IC design fails the signal integrity analysis; and program code configured to modify an edge of any failing FET that is closer than a threshold distance to a well edge.

The foregoing and other features of the invention will be apparent from the following more particular description of embodiments of the invention.

BRIEF DESCRIPTION OF DRAWINGS

The embodiments of this invention will be described in detail, with reference to the following figures, wherein like designations denote like elements, and wherein:

FIG. 3 shows a flow diagram illustrating operational methodology of the system of FIG. 2.

DETAILED DESCRIPTION

Figure 1:
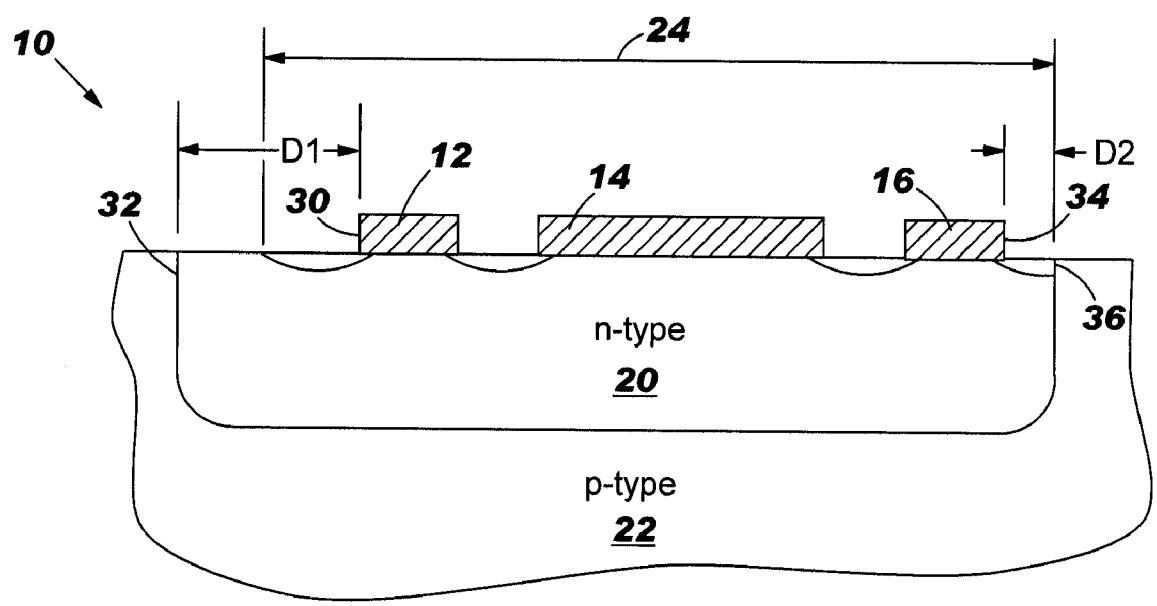
FIG. 1 shows a conventional CMOS pFET illustrating a device that is too close to a well edge.
Figure 2:
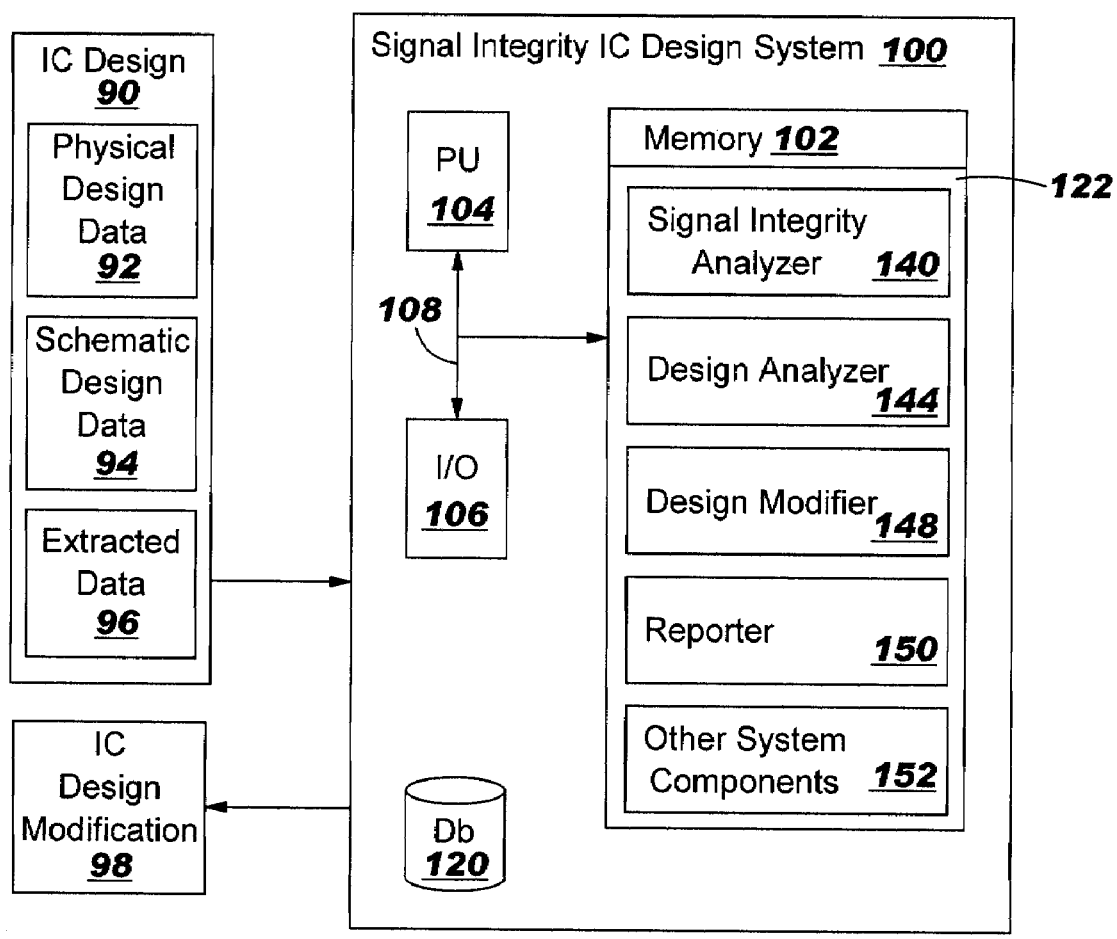
FIG. 2 shows a block diagram of a signal integrity IC design system according to the invention.

With reference to the accompanying drawings, FIG. 2 is a block diagram of a signal integrity IC design system 100 in accordance with the invention. Design system 100 includes a memory 102, a processing unit (PU) 104, input/output devices (I/O) 106 and a bus 108. A database 120 may also be provided for storage of data relative to processing tasks. It should be recognized that even though system 100 will be described in terms of a separate system, the teachings of the invention are equally applicable where system 100 is part of a larger IC design system (not shown).

Memory 102 includes a program product 122 that, when executed by PU 104, comprises various functional capabilities described in further detail below. Memory 102 (and database 120) may comprise any known type of data storage system and/or transmission media, including magnetic media, optical media, random access memory (RAM), read only memory (ROM), a data object, etc. Moreover, memory 102 (and database 120) may reside at a single physical location comprising one or more types of data storage, or be distributed across a plurality of physical systems. PU 104 may likewise comprise a single processing unit, or a plurality of processing units distributed across one or more locations. I/O 106 may comprise any known type of input/output device including a network system, modem, keyboard, mouse, scanner, voice recognition system, CRT, printer, disc drives, etc. Additional components, such as cache memory, communication systems, system software, etc., may also be incorporated into system 100.

As shown in FIG. 2, program product 122 may include a signal integrity analyzer 140, a design analyzer 144, a design modifier 148, a reporter 150 and other system components 152. Other system components 152 may include any other function necessary for implementation of system 100 not explicitly described herein.

Referring to FIG. 3, operational methodology of system 100 will now be described. In a first preliminary step S1, an IC design 90 (FIG. 2) is generated including physical design data 92, schematic design data 94 and extracted data 96. IC design 90 may be generated by any now known or later developed computer aided schematic entry and physical design layout systems (not shown), which may include system 100 as described herein.

In a second step S2, a signal integrity (noise) analysis is conducted by signal integrity analyzer 140. Signal integrity analyzer 140 may be part of any now known or later developed signal integrity tool for determining parasitic resistances and capacitances from extracted data 96. In one embodiment, analyzer 144 may be part of any now known or later developed signal integrity tool, such as Cadence's® Pacific, Magma's®BlastNoise, Synopsys'® PrimeTime SI, capable of specifying elements that cause a failure. In particular, the tool reads the extracted resistances and capacitances from a netlist, and analyzes the signal integrity (e.g., noise immunity) of the design, or more specifically, the ability of the design to function properly in the presence of noise. "Noise" is any voltage deviation from a normal, desired level. Noise can cause undesired changes in the state of the circuit, thereby possibly upsetting a normal calculation, or changing desired output values to something not desired. While signal integrity analyzer 140 has been illustrated as part of system 100, the analyzer can be provided as a separate system that the rest of system 100 interfaces with using conventional communication protocols. As part of this step, signal integrity analyzer 140 also determines whether the IC design passes the signal integrity criteria. If YES, then the process ends. If NO, processing proceeds to step S3.

At step S3, an identification of any field effect transistor (FET) that causes a signal integrity failure is made by design analyzer 144.

At step S4, an edge of a failing FET that is closer than a threshold distance to a well edge is modified automatically by design modifier 148. That is, the failing FET's threshold voltage Vt is made more robust. In one embodiment, modification includes moving the edge of a failing FET away from a respective well edge. However, other modifications may also be possible. The "threshold distance" may be any distance at which the FET edge creates a well proximity effect with the well edge. A "well proximity effect" may be any diminishing of signal integrity caused by a closeness of a FET edge to a well edge. Accordingly, the threshold distance for a particular technology may be a distance to a well edge within which a device's signal integrity is unacceptably diminished, e.g., too much noise is present. The threshold distance, accordingly, can be specified as a design rule that is user specified and/or device dependent and/or technology specific.

At step S5, the signal integrity analysis on the IC design is repeated by signal integrity analyzer 140 to determine whether the modification corrected the signal integrity failure. If the IC design fails the integrity analysis again (NO at step S5), then a determination as to whether all failing FET edges have been modified is made by design analyzer 144 at step S6. If the determination is NO at step S6, design modifier 148 modifies another failing FET at step S4. If the determination is YES at step S6, then reporter 150 reports that the signal integrity failure cannot be corrected by modification of an edge of any failing FET, at step S7. That is, a noise failure cannot be resolved by making FETs more robust.

If the IC design passes the signal integrity analysis again (YES at step S5), then reporter 150 reports that the modification is required to a physical IC design 92, at step S8, and outputs the IC design modification 98 (FIG. 2). That is, reporter 150 directs the designer to the offending FET(s) and instructs the designer to make the geometrical changes to the FET(s), which will make the FET(s) more robust.

In the previous discussion, it will be understood that the method steps discussed are performed by a processor, such as PU 104 of system 100, executing instructions of program product 122 stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

The invention claimed is:

1. A method of designing an integrated circuit (IC) for signal integrity, the method comprising:

conducting a signal integrity analysis on an IC design;

identifying any field effect transistor (FET) that causes a signal integrity failure in the case that the IC design fails the signal integrity analysis; and modifying an edge of a failing FET that is closer than a threshold distance to a well edge.

2. The method of claim 1, further comprising repeating the signal integrity analysis on the IC design to determine whether the modification corrected the signal integrity failure.

3. The method of claim 2, further comprising:

determining whether all failing FET edges have been modified in the case that the modification does not correct the signal integrity failure; and repeating the modifying step for another failing FET in the case that all failing FET edges have not been modified.

4. The method of claim 3, further comprising reporting that the signal integrity failure cannot be corrected by modification of an edge of any failing FET in the case that all failing FET edges have been modified.

5. The method of claim 2, further comprising reporting that modification to a physical IC design is required in the case that the modification corrected the signal integrity failure.

6. The method of claim 1, wherein the threshold distance indicates a distance at which the failing FET edge creates a well proximity effect with the well edge.

7. The method of claim 1, wherein the modifying step includes moving the edge of a failing FET away from a respective well edge.

8. A system for designing an integrated circuit (IC) for signal integrity, the system comprising:

means for conducting a signal integrity analysis on an IC design;

means for identifying any field effect transistor (FET) that causes a signal integrity failure in the case that the IC design fails the signal integrity analysis; and means for modifying an edge of any failing FET that is closer than a threshold distance to a well edge.

9. The system of claim 8, further comprising means for repeating the signal integrity analysis on the IC design to determine whether the modification corrected the signal integrity failure.

10. The system of claim 9, further comprising:

means for determining whether all failing FET edges have been modified in the case that the modification does not correct the signal integrity failure; and means for repeating the modifying step for another failing FET in the case that all failing FET edges have not been modified.

11. The system of claim 10, further comprising means for reporting that the signal integrity failure cannot be corrected by modification of an edge of any failing FET in the case that all failing FET edges have been modified.

12. The system of claim 9, further comprising means for reporting that modification to a physical IC design is required in the case that the modification corrected the signal integrity failure.

13. The system of claim 8, wherein the threshold distance indicates a distance at which the FET edge creates a well proximity effect with the well edge.

14. The system of claim 8, wherein the modifying means moves the edge of any failing FET away from a respective well edge.

15. A computer program product comprising a computer useable medium having computer readable program code embodied therein for designing an integrated circuit (IC) for signal integrity, the program product comprising:

program code configured to conduct a signal integrity analysis on an IC design;

program code configured to identify any field effect transistor (FET) that causes a signal integrity failure in the case that the IC design fails the signal integrity analysis; and program code configured to modify an edge of any failing FET that is closer than a threshold distance to a well edge.

16. The program product of claim 15, further comprising:

program code configured to repeat the signal integrity analysis on the IC design to determine whether the modification corrected the signal integrity failure; and program code configured to report modification to a physical IC design is required in the case that the modification corrected the signal integrity failure.

17. The program product of claim 16, further comprising:

program code configured to determine whether all failing FET edges have been modified in the case that the modification does not correct the signal integrity failure; and program code configured to repeat the modifying step for another failing FET in the case that all failing FET edges have not been modified.

18. The program product of claim 17, further comprising program code configured to report that the signal integrity failure cannot be corrected by modification of an edge of any failing FET in the case that all failing FET edges have been modified.

19. The program product of claim 15, wherein the threshold distance indicates a distance at which the FET edge creates a well proximity effect with the well edge.

20. The program product of claim 15, wherein the modifying program code moves the edge of any failing FET away from a respective well edge.

* * * * *